United States Patent [19]

Kurakazu et al.

[11] Patent Number: 5,644,703
[45] Date of Patent: *Jul. 1, 1997

[54] DATA PROCESSOR PROVIDING FAST BREAK IN PROGRAM EXECUTION

[75] Inventors: Keiichi Kurakazu, Tachikawa; Yoshikazu Aoto, Fuchu; Shiro Baba, Tokorozawa; Satoshi Masuda, Sayama; Hiroyuki Kida, Hitachi; Shinji Kawashima; Yoshiaki Naruse, both of Hachioji, all of Japan

[73] Assignee: Hitachi, Ltd., Tokyo, Japan

[*] Notice: The term of this patent shall not extend beyond the expiration date of Pat. No. 5,493,659.

[21] Appl. No.: 554,805

[22] Filed: Nov. 7, 1995

Related U.S. Application Data

[63] Continuation of Ser. No. 626,740, Dec. 13, 1990, Pat. No. 5,493,659, which is a continuation of Ser. No. 215,506, Jul. 6, 1988, Pat. No. 4,998,197.

[30] Foreign Application Priority Data

Jul. 6, 1987 [JP] Japan .................... 62-168086
Aug. 28, 1987 [JP] Japan .................... 62-214200

[51] Int. Cl.⁶ .................... G06F 9/44; G06F 9/46
[52] U.S. Cl. .................... 395/183.11; 364/232.9; 364/242.1; 364/263.2; 364/DIG. 1

[58] Field of Search .................... 395/375, 800

[56] References Cited

U.S. PATENT DOCUMENTS

| | | | |
|---|---|---|---|
| 4,338,660 | 7/1982 | Kelley et al. | 395/183.1 |
| 4,635,193 | 1/1987 | Moyer et al. | 395/375 |
| 4,656,578 | 4/1987 | Chilinski et al. | 395/375 |
| 4,674,089 | 6/1987 | Ponet et al. | 395/183.04 |

*Primary Examiner*—Kevin J. Teska
*Assistant Examiner*—Ayni Mohamed
*Attorney, Agent, or Firm*—Antonelli, Terry, Stout & Kraus, LLP

[57] ABSTRACT

A circuit by which an SWI instruction held in a memory circuit is switchedly input in response to a signal supplied externally is provided in a processor, whereby the substitution of a program word can be realized using such an internal circuit, so that a high-speed and reliable break in program execution can be effected. Moreover, an interrupt function separate from normal interrupts is established by setting a specified operation mode, whereby, when a data processor is used as an emulator, the break of a user program including the ordinary interrupt processes can be easily effected by utilizing the special interrupt function. Also, by additionally providing the function of delivering out a signal indicative of the break status, an external circuit can be simplified.

3 Claims, 5 Drawing Sheets

DATA PROCESSOR PROVIDING FAST BREAK IN PROGRAM EXECUTION

CROSS-REFERENCES TO RELATED APPLICATIONS

This is a continuation of application Ser. No. 07/626,740 filed on Dec. 13, 1990, now U.S. Pat. No. 5,493,659, which is a continuation of application Ser. No. 07/215,506 filed on Jul. 6, 1988, now U.S. Pat. No. 4,998,197.

BACKGROUND OF THE INVENTION

In developing software for a microcomputer, various development aids are utilized. As a typical example, an in-circuit emulator (ICE) is extensively employed. One of the functions of the ICE is the so-called "address break function" according to which, when the execution of the instructions of the software of a user has proceeded to a certain address, the process is tentatively suspended, and the status of the microcomputer at that time is displayed. In order to realize the break function, a non-maskable interrupt ($\overline{\text{NMI}}$), which is one of the available interrupt functions of the microcomputer, is employed. More specifically, when a user program has proceeded to an address to which a break is to be applied, this address is detected, and an $\overline{\text{NMI}}$ request is input to the microcomputer. Upon accepting the $\overline{\text{NMI}}$ request, the microcomputer suspends the user program tentatively and shifts its control to the ICE side. Thus, the microcomputer starts the run of an ICE program and performs the display of its internal status, etc. accordingly. Alternatively, when the address to which the break is to be applied is detected, an instruction on that occasion is altered to a software interrupt request instruction (SWI), which is executed, whereby the tentative suspension of the user program similar to the above is effected to shift the control to the ICE side.

Such an in-circuit emulator is described in, for example, "HITACHI MICROCOMPUTER SYSTEM 6305UO/6305VO EMULATOR USERS MANUAL" issued by Hitachi, Ltd. in September 1985.

Meanwhile, a microcomputer having an instruction prefetch function has been developed for the purpose of increasing the information processing speed. In this case, a discrepancy may arise between the fetch address of a program and the address of an instruction which is actually executed. Therefore, a break based on an $\overline{\text{NMI}}$ request as stated before incurs the problem that the break occurs immediately at the address of an instruction which is not executed. In such a case, there may be employed the technique as described above wherein, when the address at which the program is to be broken is detected, the instruction on the occasion is replaced with the SWI (software interrupt). For the replacement of the instruction, however, it is required that a bus to which the microcomputer and a memory device storing the program therein are coupled is switched so as to input the instruction word SWI. In this case, in the microcomputer whose speed is raised as stated above, the fetching of the instruction becomes fast, so that the switching of the bus is not in time, and the break as stated above fails to be realized.

Moreover, when the $\overline{\text{NMI}}$ and SWI interrupts are employed for the break of the user program, as described above, the user program becomes subject to the limitation that the interrupt processes, such as $\overline{\text{NMI}}$ and SWI, cannot be applied as they are. Besides, an external circuit needs to be provided for detecting the fact that the data processing function of the microcomputer has shifted to the run of the program on the ICE side. For this reason, the number of components of the in-circuit emulator is increased in correspondence with the external circuit.

SUMMARY OF THE INVENTION

An object of this invention is to provide a data processor having a high-speed and reliable break function, with a simple arrangement.

Another object of this invention is to provide a data processor which realizes multiple functions.

The aforementioned and other objects and novel features of this invention will become apparent from the description provided in the following specification and the accompanying drawings.

Typical aspects of performance of this invention are briefly summarized as follows: A circuit is provided by which instruction words or data items held in a memory circuit are switched and input in accordance with signals supplied from outside. In addition, an interrupt function separate from normal interrupts is established by setting a specified operation mode.

According to the above expedient, fetched programs and the specified instructions or data items are replaced by means of the internal circuit, so that high-speed and reliable breaks can be realized. Besides, when the specified operation mode is set, a user program including ordinary interrupt processes can be easily broken with the special interrupt function.

DESCRIPTION OF THE PREFERRED EMBODIMENTS

Figure 1:
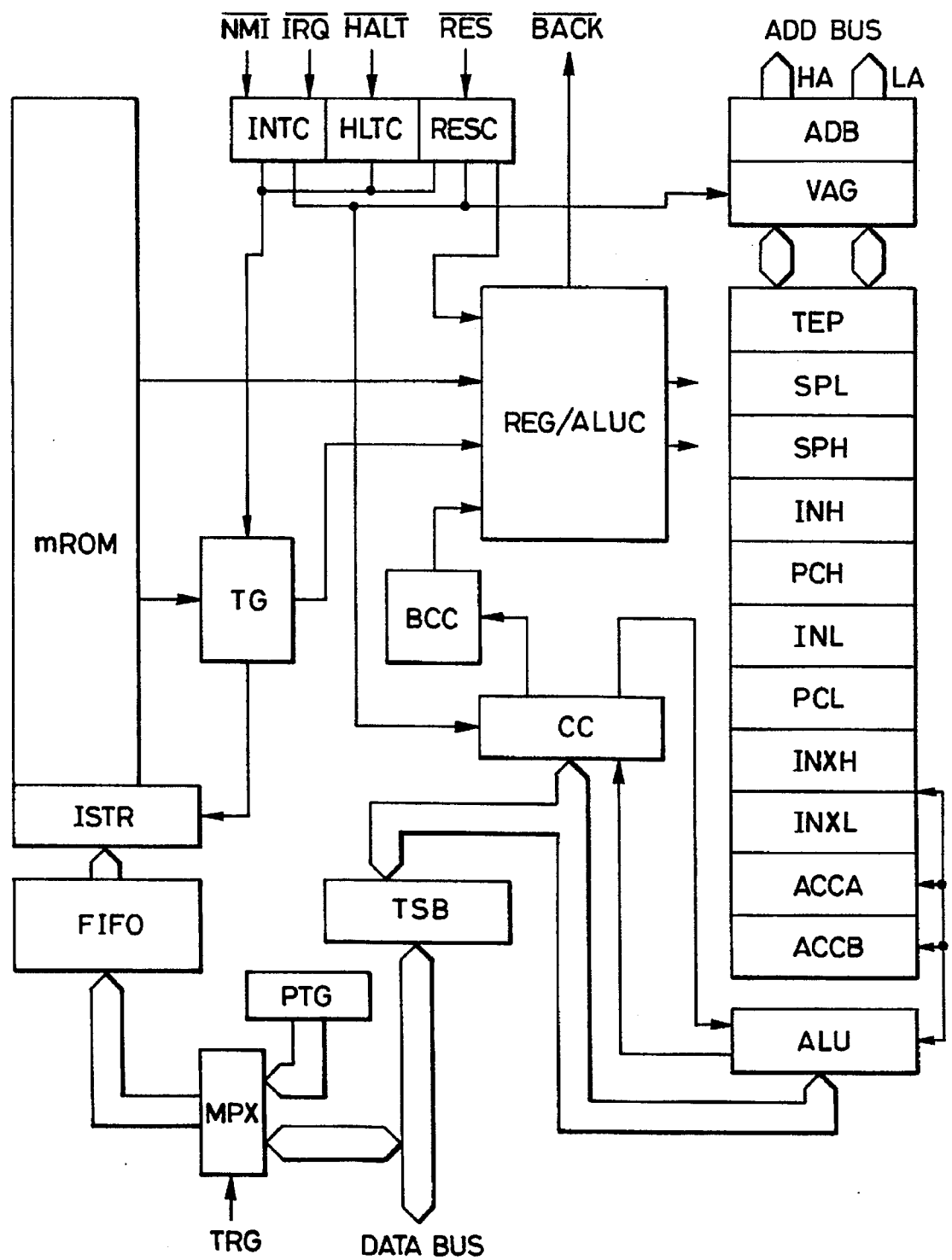
FIG. 1 is a block diagram showing an embodiment of a microprocessor to which this invention is applied.

FIG. 1 is a block diagram of a first embodiment of a microprocessor to which this invention is applied. Although not essential to the invention, the microprocessor in the figure is formed on a single semiconductor substrate, such as of single-crystal silicon, by known techniques for manufacturing semiconductor integrated circuits.

The microprocessor of this embodiment is constructed of an arithmetic-logic unit 10, an instruction register 12, a microprogram ROM 13 (hereinbelow, termed "mROM") which decodes instruction words stored in the instruction register 12 and forms various control signals required for executing them, and a control circuit 14 which controls various registers 15 to be described below and the arithmetic-logic unit 10.

By way of example, a programmer can utilize the registers 15 in the following ways. In a microprocessor composed of, for example, 8 bits, program counters PCL and PCH are provided as 2-byte (16-bit) registers, and they function to indicate a current program address. Incrementers INL and INH are also provided as registers which perform the operations of incrementing (+1) the program counters PCL and PCH. A register TEP is a temporary register. Stack pointers SPL and SPH are 2-byte registers, and they function to indicate an address effective in a stack operation which is subsequently performed in an external push-down/pop-out stack area. A RAM (random access memory) is usually employed for the stack area, and it can be situated at any desired address. In case of a use in which information within a stack is to be conserved at the time of a failure of the power supply, the RAM employed for the stack area is furnished with a battery backup function. Index registers INXL and INXH are registers of 2 bytes, and they serve to store data or a 16-bit memory address for use in an index mode of memory addressing. Accumulators ACCA and ACCB function to temporarily hold an operand or an operated result from the arithmetic-logic unit 10.

A condition code register CC 16 indicates the status of the operated result of the arithmetic-logic unit 10. It has the flags of, for example, negative, zero, overflow, carry from bit 7, and half-carry from bit 3. In addition, it has an interrupt mask bit. If this mask bit is set, an interrupt from an $\overline{IRQ}$ (interrupt request) terminal is not accepted. When an interrupt signal from the $\overline{IRQ}$ terminal is supplied in the reset status of the mask bit, an interrupt sequence is started after the completion of an instruction cycle under execution. More specifically, the contents of the program counters PCL, PCH, index registers INXL, INXH, accumulators ACCA, ACCB, and condition code register CC 16 are stored in a stack. Then, the mask bit is set so as not to accept any further interrupt ($\overline{IRQ}$). An address stored in a specified memory address is stored in the program counter, and the control of the microprocessor is branched to the interrupt sequence indicated by this program counter.

The control circuit 14 performs the selection of any of the various registers, as well as the operation control thereof, and the control of the arithmetic-logic unit 10 in accordance with an output from the mROM 13, the content of the condition code register CC 16, and the order of a control circuit 18 for a branch condition control.

A timing generator circuit 20 generates timing signals necessary for the operations of the control circuit 14 and the instruction register 12, in accordance with the output of the mROM 13 and an output from an interrupt control circuit 21 to be described below.

The interrupt control circuit 21 receives an $\overline{NMI}$ signal and the $\overline{IRQ}$ signal supplied externally, and forms control signals for an interrupt process. A halt control circuit 22 receives a $\overline{HALT}$ signal supplied externally, and brings the operation of the microprocessor into a halt status. By way of example, when the signal $\overline{HALT}$ is at a high level, the microprocessor executes an instruction, and when it becomes a low level, the microprocessor assumes a halt status. The microprocessor is, in effect, separated from a system bus in this halt status. A reset control circuit 23 receives a signal $\overline{RES}$ supplied externally, and controls a reset operation. By way of example, this signal $\overline{RES}$ is used when the microprocessor is reset and started from the "off" condition of the power supply. It is also used in a case where the microprocessor is re-initialized at any desired point of time after having been started.

Although not essential, this embodiment is provided with an instruction pre-fetch function for the purpose of high-speed data processing. To this end, an instruction word or data which is input from a data bus is transmitted to the instruction register 12 through a FIFO (first-in first-out) memory 25 which forms an instruction holding circuit.

In this embodiment, a multiplexer 26 is disposed at the input of the FIFO 25 in order to furnish the microprocessor with a function of realizing a break at any desired execution address with speed and reliability. The inputs of this multiplexer 26 on one side are coupled to a data bus (DATA BUS). The inputs of the multiplexer 26 on the other side are supplied with the output signals of a pattern generator circuit 28. This instruction store 28 is constructed of a memory circuit, in which the SWI instruction explained before is stored by way of example. The multiplexer 26 has its switching controlled by a trigger signal TRG which is externally supplied. When the SWI instruction is executed, a signal $\overline{BACK}$ indicating the acceptance of the interrupt is output from the control circuit 14.

The data bus (DATA BUS) is coupled to an internal data bus 31 through a three-status output circuit 30.

The microprocessor of this embodiment loads instructions from the data bus and stores them in the FIFO memory 25 in succession. In this case, the trigger signal TRG is set at a low level by way of example, and the multiplexer 26 is switched to the data bus side. Accordingly, programs fetched from an external memory device are input through the data bus (DATA BUS), and the instructions loaded through the multiplexer 26 as well as the FIFO memory 25 are successively decoded and executed. Data items formed in this data process are output from the data bus through the three-status output circuit 30. Address information items formed by the program counter are output from an address bus (ADD BUS) through a vector address generator circuit 32 as well as an address buffer 33, whereby the addressing of a ROM (read only memory) or RAM in which the instruction words are stored and the addressing of a RAM or the like which indicates the transfer destinations of the data items to be output are carried out. By way of example, the vector address generator circuit 32 generates addresses $FFFC, FFFD for the interrupt NMI and $FFF8, FFF9 for the interrupt IRQ, whereupon the control shifts to interrupt service routines.

Figure 2:
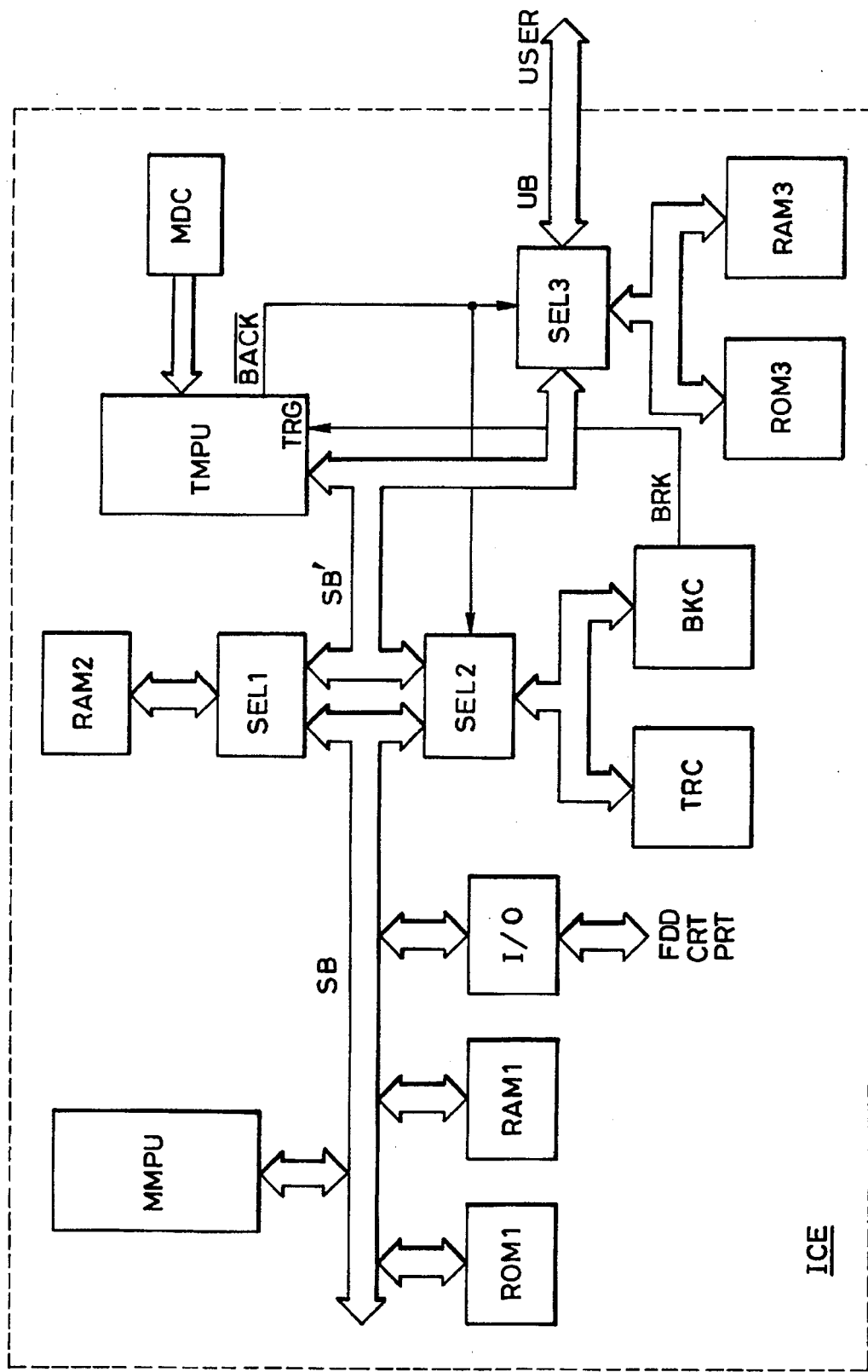
FIG. 2 is a schematic block diagram of an ICE system in which the microprocessor is employed.

Shown in FIG. 2 is a block diagram of an embodiment of an in-circuit emulator ICE in which the microprocessor of the above arrangement is employed as a target microprocessor 35.

In this embodiment, the target microprocessor 35 takes charge of the controls of a user space UB and an ICE (in-circuit emulator) system space SB. In the system space SB of the ICE, there are a main microprocessor 50; memory circuits RAM1 52 and ROM1 54 which are disposed in correspondence with the main microprocessor 50; and input/output interface circuit I/O 56 to which a floppy memory circuit FDD, a console CRT, a printer PRT, etc. are connected; a trace circuit 58; a break circuit 60; and a memory circuit RAM2 62. The trace circuit 58 and the break circuit 60 are connected to the main microprocessor 50 or the target microprocessor 35 by a selector SEL2 64. In addition, the memory circuit RAM2 62 is selectively made accessible from the main microprocessor 50 or the target microprocessor 35 by a selector SEL1 66. The target microprocessor 35 is connected to the system space SB through the selector SEL1 66 or SEL2 64 as mentioned above, and it operates under the control of the main microprocessor 50.

By way of example, when a break command and a break address are applied as inputs from the console CRT, the main microprocessor 50 writes the applied break command into the memory circuit RAM2 62 and writes the break address into a register within the break circuit 60.

The break circuit 60 has an address comparator circuit (not shown), which compares the break address stored in the register and an address signal delivered as an output from the target microprocessor 35 (the address signal of the address bus of the user space UB). On this occasion, a selector SEL3 68 connects the target microprocessor 35 and the user space UB in accordance with the high level of the break acknowledge signal $\overline{BACK}$ which is output from the target microprocessor 35. Thus, until a break is accepted, that is, during the period of time during which the break acknowledge signal $\overline{BACK}$ is at the high level, as illustrated in a timing chart of FIG. 3, the target microprocessor 35 is performing a data processing operation which conforms to a program to-be-developed stored in a ROM or the like (not shown) in the user space UB.

When the break address and the execution address of the target microprocessor 35 coincide, the break circuit 60 changes a break signal BRK from a low level to a high level. Thus, the target microprocessor 35 inserts an SWI instruction in response to a high level of the trigger signal TRG. Besides, when the break has been executed as described later, the signal $\overline{BACK}$ becomes active at its low level. In accordance with the low level of the signal $\overline{BACK}$, the selector SEL3 68 disconnects the user space UB from the target microprocessor 35 and connects memory circuits ROM3 70 and RAM3 72. The contents of the program counters PCL, PCH, condition code register 16, etc. of the target microprocessor 35 at the time of the break are stacked in the memory circuit RAM3 72. Thereafter, according to a program in the memory circuit ROM3 70, the target microprocessor 35 analyzes a command in the memory circuit RAM2 62, and it fetches the contents of the program counters PCL, PCH, condition code register 16, etc. written in the memory circuit RAM3 72 and writes them into the memory circuit RAM2 62. The information items written in the memory circuit RAM 2 62 are fetched and are displayed through the input-output interface circuit 56 in such a way that the main microprocessor 50 operates according to the program of the memory circuit ROM1 52.

The signal $\overline{BACK}$ returns from the low level to the high level in such a way that the target microprocessor 35 executes a return instruction written in the memory circuit ROM3 70.

A mode setting circuit 75 generates the operation mode signals of the target microprocessor 35.

When the trigger signal TRG (break signal BRK) is set at its high level, the target microprocessor 35 switches the multiplexer 26 to the side of the instruction store 28 in FIG. 1. Thus, a program word stored at the above address is replaced with a SWI instruction stored in the instruction store 28, and this instruction is input to the FIFO 25.

When the SWI instruction is input to the instruction register 12 through the FIFO 25, the execution thereof results in storing the contents of the program counters PCL, PCH, index registers INXL, INXH, accumulators ACCA, ACCB, and condition code register 16 in a stack in an operation similar to the interrupt process described before. Subsequently, the mask bit is set so as not to accept any further interrupts. Then, $FFF8 AND FFF9 are respectively set in the program counters PCL and PCH as in the foregoing interrupt by way of example, and the control is branched to an interrupt sequence stored at this address. In this way, the break is effected, whereupon the microprocessor shifts from the user program to the ICE system program stored in the memory circuit ROM3 70, in FIG. 2 and performs, for example, the data process for outputting the internal statuses of the microprocessor as described above. By the way, in a case where the microprocessor MPU has a built-in watchdog timer circuit, the timer operation thereof is invalidated in accordance with the break operation based on the SWI instruction.

As a signal $\overline{BACK}$ for externally delivering the break status as an output, in order to distinguish this status from an interrupt based on an ordinary SWI instruction, a latch circuit (not shown) for holding the fact that the trigger signal TRG as an input may be provided so as to deliver the logical product between the output of this latch circuit and a signal formed by the execution of the SWI instruction.

In a case where the insertion of the SWI instruction by the instruction store 28 is not desired to be opened to users, a mode setting terminal and a mode determining circuit as described below, for example, may be provided, whereby the input of the trigger signal TRG is validated only when the ICE mode has been designated. More specifically, in case of employing the microprocessor of the foregoing arrangement for an in-circuit emulator, a signal indicative of this situation is supplied to the mode setting terminal. Upon decoding the signal level of the mode setting terminal, the mode determining circuit brings a mode signal to a high level (logic "1"). The trigger signal TRG is input through an AND gate circuit which is controlled by this mode signal.

In a case where the break of the user program is to be effected with a high reliability, a comparator circuit is provided. By way of example, when the microprocessor has decoded an SWI instruction, whether or not the ICE mode is designated is detected by the comparator circuit to be described later, and the instruction is executed only in the ICE mode. In this case, the AND gate circuit to which the trigger signal TRG is input may well be omitted. This arrangement permits SWI instructions to be used as they are in the user program. Accordingly, the address of interrupt service routines may be made different in the ICE mode and the user mode.

In this embodiment, instruction words SWI held in a memory circuit are switched and are, in effect, input by signals supplied externally, so that high-speed and reliable breaks can be realized. Besides, even in a case where an instruction pre-fetch function is utilized as in the described embodiment, the instruction word is switched by detecting an address, and hence, the SWI instruction can be inserted into the desired address for the break.

Further, since no interrupt terminal is used, interrupt signals $\overline{NMI}$, $\overline{IRQ}$ etc. can be employed in a user program. If a mode determining circuit, etc. are provided, it also becomes possible to insert the SWI instructions into the user program. By bestowing the function of supplying an external terminal with an output indicative of the proceeding of the break, it is unnecessary to additionally provide any special circuit outside, and the simplification of an emulator system can be attained.

Figure 4:
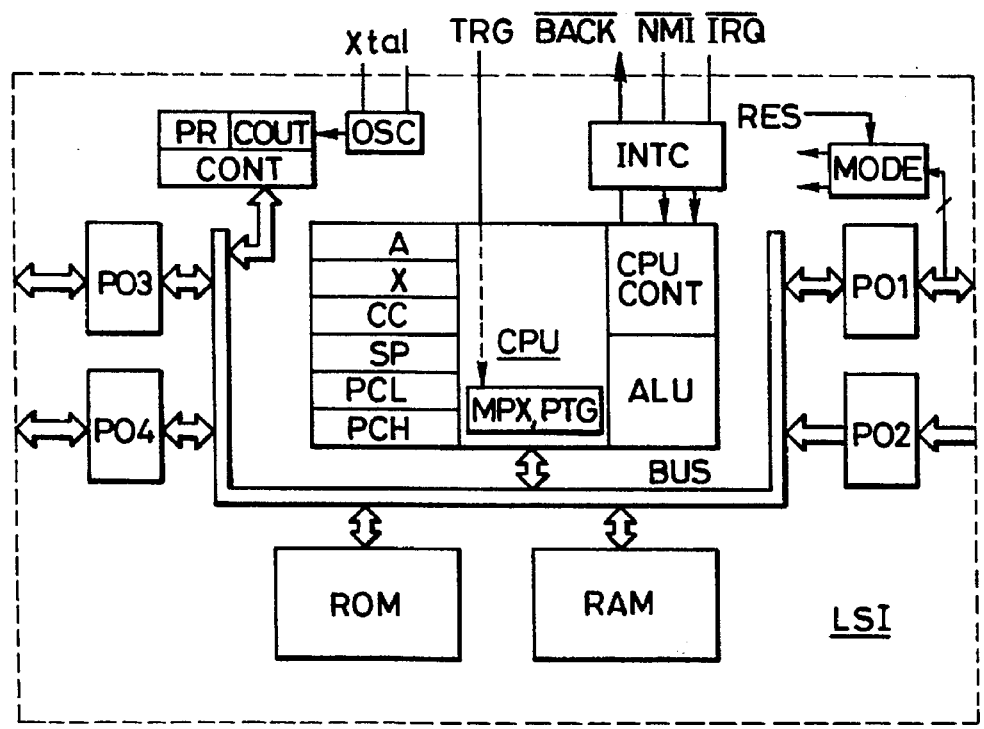
FIG. 4 is a block diagram showing an embodiment of a one-chip microcomputer to which this invention is applied.

Shown in FIG. 4 is a block diagram of a second embodiment of a microcomputer of single chip construction to which this invention is applied. In the figure, a portion enclosed with a broken line is an integrated circuit LSI. Various circuit blocks indicated here form the single-chip microcomputer as a whole, and they are formed on a single semiconductor substrate, such as of single-crystal silicon, by known techniques for manufacturing semiconductor integrated circuits.

Indicated by 100 is a processor CPU, the principal constituent blocks of which are typically exemplified.

Symbol A denotes an accumulator, symbol X an index register, symbol CC a condition code register, symbol SP a stack pointer, symbols PCH and PCL program counters, symbol CPU-CONT a CPU controller, and symbol ALU an arithmetic-logic unit.

The arrangement of such a processor CPU has been known from, for example, "FUNDAMENTALS OF MICROCOMPUTERS" by Kohji Yada, published by Kabushiki-Kaisha Ohm-sha on Apr. 10, 1978, and the outlines of the functions of the respective registers are similar to those explained before, so that the registers shall not be described in detail.

Input/output ports PO1 through PO4 are provided, in which data transfer direction registers are respectively included. Each of the input/output ports PO3 and PO4 is used for inputting and outputting data of 8 bits, and it also has the function of delivering out address signals carried on a bus BUS to be described below. By way of example, a multiplexer is disposed between the input/output port PO3 and the bus BUS and is switched so as to switch the data and the address. In addition, the input/output port PO4 operates as a data input/output port or an address output port in accordance with the setting of an operation mode.

Although not essential, the input/output port PO2 is composed of six terminals and has an input/output direction determined by the data direction register thereof. An output buffer of 6 bits is constructed as a three-status output buffer, and it becomes a high impedance status when the input/output port PO2 is operated in the input direction. Four of the terminals of the input/output port PO2 are used for mode programming during a reset period. The levels of the four terminals in a reset operation are held in the latch circuit of the input/output port PO2. The kinds of modes to be set with the four terminals are, for example, a single-chip mode, an expanded multiplex mode, an expanded non-multiplex mode, and the ICE mode as described before. Such modes are discriminated by a mode determination circuit 110. The mode determination circuit 110 of this embodiment is shared with the other signal terminals as stated above, so that the mode setting signals supplied from the four terminals are validated when a system reset signal RES has been received. That is, in setting the mode anew, it is a condition to reset the microprocessor.

An oscillation circuit 112 forms a reference frequency signal of high precision by utilizing an externally-mounted crystal oscillator Xtal, for example. Clock pulses required in the microprocessor 100 are formed on the basis of the reference frequency signal. Besides, the reference frequency signal is used as the reference time pulse of a timer. This timer is constructed of a counter 114, a prescaler PR and a controller CONT. A watchdog timer circuit is also included in such a timer.

A random access memory RAM 120 is used as a memory circuit for temporary data, a stack area or a general register by way of example. A read only memory ROM 122 is provided into which programs ect. for various information processes are principally written. This ROM 122 is constructed of a mask type ROM, an EPROM (erasable and programmable) read-only memory rendered unerasable, or the like.

The various circuit blocks mentioned above are interconnected around the microprocessor CPU by the bus BUS, This bus BUS includes a data bus and an address bus.

An interrupt control circuit 125 performs interrupt control operations for interrupt signals $\overline{\text{NMI}}$ and $\overline{\text{IRQ}}$ as stated before. In the figure, an output signal $\overline{\text{BACK}}$ indicating a break status in the ICE mode is also depicted as being output through the interrupt control circuit 125.

The halt control circuit 22 and reset control circuit 23 described before may well be included in the interrupt control circuit 125. In this case, corresponding input signals $\overline{\text{HALT}}$ and $\overline{\text{RES}}$ are supplied. As input terminals for such interrupts, any terminals in the input/output ports PO1 thru PO4 may well be shared.

In this embodiment, the microprocessor 100 is provided with a multiplexer MPX and an instruction store IS as in the foregoing. The multiplexer MPX has its switching controlled by a trigger signal TRG. In this embodiment, the input of the trigger signal TRG is validated only when the ICE mode has been designated by the mode determination circuit 110. Although no special restriction is meant, the address signals are delivered out through any of the ports during the run of the program stored in the ROM 122. When a specified address has been detected by monitoring the address signals, the trigger signals TRG is input, whereby a break based on an SWI instruction as in the foregoing becomes impossible. It is needless to say that, on this occasion, the ICE mode is indicated to the mode determination circuit 110. In this embodiment, an interrupt based on the SWI instruction is validated only in the ICE mode as in the foregoing. Besides, the signal indicative of the proceeding of the break can be output from a terminal BACK.

In addition, the input of the trigger signal TRG in an ordinary mode can be invalidated by designating an input to the mode determination circuit 110.

Figure 5:
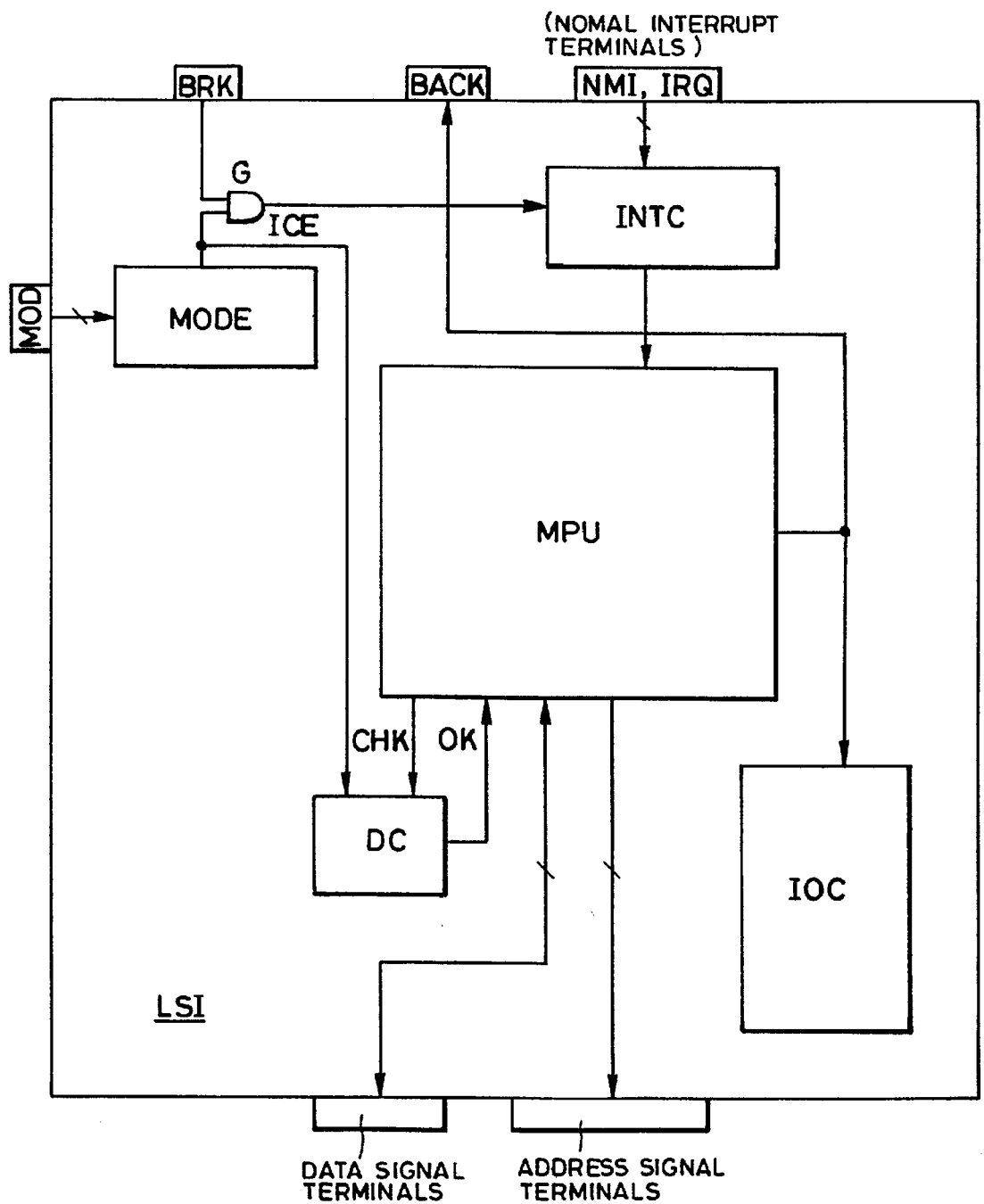
FIG. 5 is a block diagram showing another embodiment of the microprocessor to which this invention is applied.

Shown in FIG. 5 is a block diagram of a third embodiment of the microprocessor to which this invention is applied. Although not essential, the microprocessor in the figure is formed on a single semiconductor substrate, such as of single-crystal silicon, by known techniques for manufacturing semiconductor integrated circuits.

Since the fundamental arrangement of the processor MPU 200 is as understood from the description concerning FIG. 1 or has been extensively known from various publications such as "HITACHI MICROCOMPUTER DATA BOOK" issued by Hitachi, Ltd. in September 1985, the internal construction thereof shall not be illustrated. This processor is constructed of an arithmetic-logic unit, an instruction register, an instruction decoder which decodes an instruction word stored in the instruction register and generates various control signals and timing signals necessary for the execution thereof, various registers, a control circuit which controls the arithmetic-logic unit as well as the registers, etc.

By way of example, the registers which a programmer can utilize include the following as in the foregoing: In the microprocessor composed of, for example, 8 bits, program counters are 2-byte (16-bit) registers, and they function to indicate a current program address. Stack pointers are 2-byte registers, and they function to indicate an address effective in a stack operation which is subsequently performed in an external push-down/pop-out stack area. A RAM is usually employed for the stack area, and it can be situated at any desired address. In case of a use in which information within a stack is to be conserved at the failure of power supply, the RAM employed for the stack area is furnished with a battery backup function.

Index registers are registers of 2 bytes, and they serve to store data or a 16-bit memory address for use in an index mode of memory addressing. Accumulators function to temporarily hold an operand or an operated result from the arithmetic-logic unit. A condition code register indicates the status of the operated result of the arithmetic-logic unit. It has the flags of, for example, negative, zero, overflow, carry from bit 7, and half-carry from bit 3. In addition, it has an interrupt mask bit. If this mask bit is set, an interrupt from an $\overline{IRQ}$ (interrupt request) terminal is not accepted. When an interrupt signal is supplied from the $\overline{IRQ}$ terminal in the reset status of the mask bit, an interrupt sequence is started after the completion of an instruction cycle under execution.

More specifically, the contents of the program counters, index registers, accumulators, and condition code register are stored in the stack. Then, the mask bit is set so as not to accept any further interrupt ($\overline{IRQ}$). Thereafter, an address stored in a specified memory address is stored in the program counter, and the control of the microprocessor is branched to the interrupt sequence indicated by this program counter. Although not essential, the condition code register is endowed with, besides the flags mentioned above, a flag which indicates an acknowledgement for a break request signal as described later.

Although not essential, a built-in input/output device IOC 205 includes a RAM (random access memory), a timer circuit, a watchdog timer circuit for monitoring the internal operating status of the MPU, etc. The RAM can be employed as the stack area or a general register.

The microprocessor MPU 200 successively executes instructions loaded from data signal terminals, and delivers data formed by the execution, as outputs from the data signal terminals. An address formed by the program counter is output from address signal terminals, thereby to perform the addressing of a ROM (read only memory) or RAM in which the instruction word is stored and the addressing of a RAM or the like which indicates the transfer destination of the data to be output.

The microprocessor MPU 200 as stated above is additionally provided with the following circuits:

A signal fed from at least one mode setting terminal 208 is supplied to a mode determination circuit 210. This mode determination circuit 210 decodes a signal level or the combination of signal levels from the mode setting terminal (s) 208, and generates an emulator mode signal ICE in the case of using the microprocessor 200 as an ICE. The signal ICE is, on one hand, supplied to one input of an AND gate circuit G. The other input of the AND gate circuit G is supplied with a signal from a break terminal BRK 212. The output signal of the AND gate circuit G is supplied to an interrupt control circuit 225. The interrupt control circuit 225 receives the output signal of the AND gate circuit G and also interrupt signals from normal interrupt terminals 216, such as $\overline{NMI}$ and $\overline{IRQ}$, and it transmits them to the microprocessor MPU 200.

Although not essential, the signal ICE is supplied to a comparator 220. Upon receiving a check request signal CHK for the ICE mode from the microprocessor MPU 200, the comparator 220 produces an output as to whether or not the ICE mode is proceeding. In other words, when the comparator 220 is supplied with the request signal CHK, it transmits the acknowledgement signal OK thereof to the microprocessor MPU 200. Such a function can be realized by the microprogram ROM of the microprocessor MPU 200.

Upon accepting the break request signal as stated below, the microprocessor MPU 200 sets the corresponding flag of the condition code register. Thus, a control signal for invalidating the operation of the watchdog timer circuit of the input/output device IOC is applied, and a signal for indicating a break status is delivered from an external terminal $\overline{BACK}$ 218.

In case of employing the microprocessor MPU 200 of the above arrangement as the in-circuit emulator, the mode setting terminal 208 is supplied with a signal indicative of this situation. The mode determination circuit 210 decodes the signal level of the mode setting terminal 208 and brings the signal ICE to a high level (logic "1"). In response to this high-level signal, the AND gate circuit G has its gate opened, in other words, it is enabled to input the signal from the break terminal.

Figure 3:
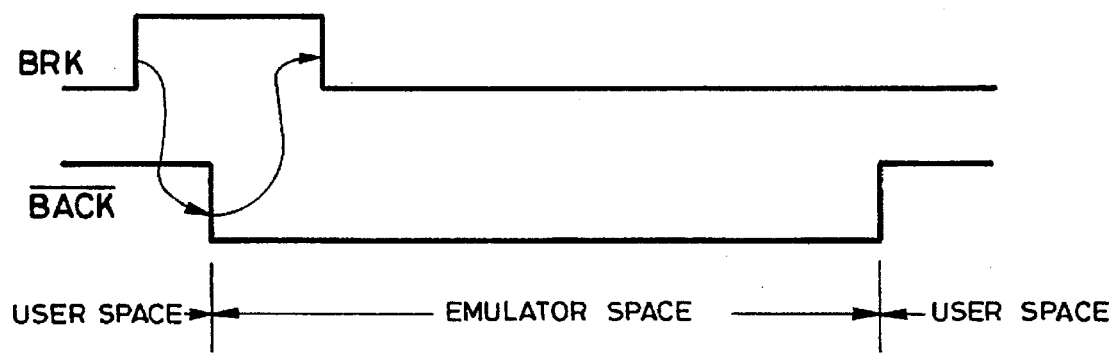
FIG. 3 is a timing chart for explaining an example of the break operation of the ICE system.

In the development of the software of a microcomputer system employing the microprocessor MPU 200, when a user program has proceeded to an address desired for the break, the address is detected and the break terminal 212 is rendered high level (active) as described with reference to FIGS. 2 and 3. The break request signal from the break terminal 212 is transmitted to the interrupt control circuit 225 through the AND gate circuit G. The interrupt control circuit 225 transmits the interrupt signal to the microprocessor MPU 200. The microprocessor MPU 200 suspends the user program and executes an interrupt sequence in accordance with a process similar to the foregoing. In this case, if necessary, the microprocessor MPU 200 may well be endowed with the function of rejecting the acceptance of a further break request, similar to the masking of the signal $\overline{IRQ}$.

When the interrupt based on the break request has been accepted, the user program is suspended, and hence, the watchdog timer of the input/output device 205 is stopped according to the flag. In addition, a signal indicative of the acceptance of the break request is output from the terminal 218.

In this embodiment, as thus far described, the interrupt for the analysis of the user program is possible with a signal different from the normal interrupt request signals, so that the normal interrupt signals $\overline{NMI}$, $\overline{IRQ}$ etc. can be employed within the user program. Moreover, since the signal indicative of the proceeding of the break is output from the external terminal 218, it is unnecessary to additionally provide an special circuit outside, and the simplification of an emulator system can be attained.

In a case where the break of the user program is to be effected with high reliability, the comparator 220 is utilized. More specifically, when the microprocessor MPU 200 is supplied with the interrupt request based on the terminal 212 from the interrupt control circuit 225, it delivers the check signal CHK to the comparator 220, and it performs the interrupt process upon receiving the signal OK for recognizing the ICE mode.

As another breaking method, a break instruction (SWI or BRK) may be provided instead of the signal from the terminal 212. More specifically, the break instructions (SW1 or BRK) is inserted in a place desired to be suspended within the user program. By the run of the user program, the break instruction (SWI or BRK) is fetched from a program memory and is transmitted to the microprocessor MPU 200. Then, the microprocessor 200 decodes the instruction, and it suspends the run of the user program as in the foregoing and shifts to the process of the ICE side similar to the case of an interrupt. On this occasion, if the comparator 220 is provided, the microprocessor 200 can execute the instruction (SWI or BRK) upon receiving the recognition signal OK for the ICE mode.

It is also permissible to provide the two break functions based on the terminal 212 and the instruction (SWI or BRK). In this case, the breaks can be effected by the optimum method conforming to the user program.

Figure 6:
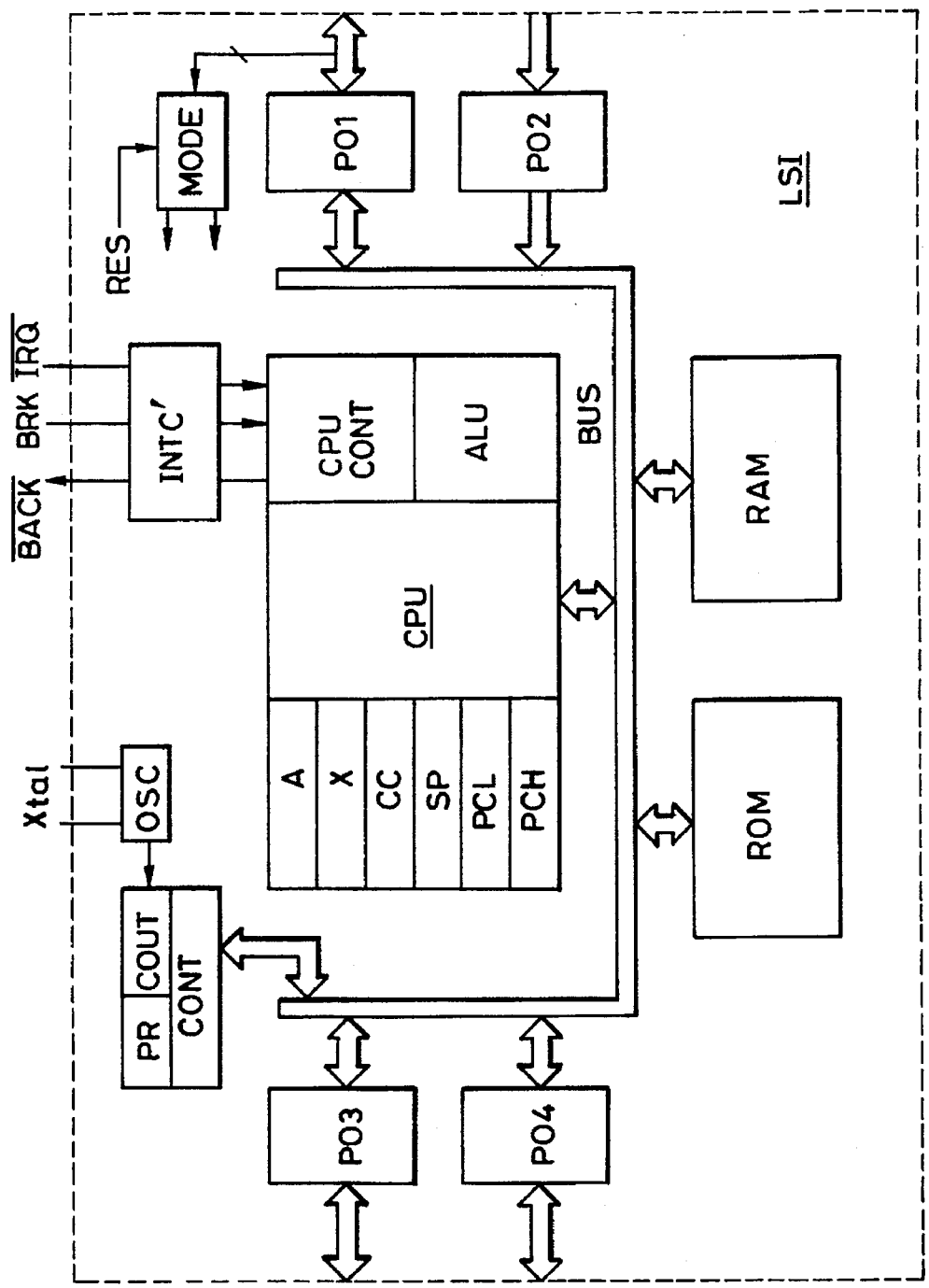
FIG. 6 is a block diagram showing another embodiment of the one-chip microcomputer to which this invention is applied.

Shown in FIG. 6 is a block diagram of a fourth embodiment of the single-chip microcomputer to which this invention is applied.

The single-chip microcomputer in the figure is basically similar to the microcomputer in FIG. 4. Therefore, a detailed description of the same constituent parts as in FIG. 4 shall be omitted from this description.

In this embodiment, an interrupt control circuit 325, is provided in order to afford the function of the normal interrupts open to users as stated before and the function of the interrupt (break) usable only in the ICE mode. This interrupt control circuit 325, includes the AND gate circuit G in FIG. 5 in addition to the interrupt control circuit 225 shown in that figure. If necessary, the interrupt control circuit 325 is also provided with the function of the comparator circuit 220 in FIG. 5. Therefore, a break signal is supplied through this interrupt control circuit 325. In FIG. 6, the signal $\overline{BACK}$ for outputting the break status is also depicted as being delivered from the interrupt control circuit 325. As a normal interrupt terminal, the terminal $\overline{IRQ}$ is typically exemplified, but it is to be understood that the terminals $\overline{NMI}$ etc. are also included. Such interrupt terminals may well be shared with any terminals among the input/output ports PO1 thru PO4.

Also in this embodiment, the interrupt from the terminal BRK is validated only in the ICE mode as in the foregoing. In addition, this holds true for the case of providing the break instruction (SWI or BRK).

Functional effects which are attained by the above embodiments are as follows:

(1) A circuit by which an SWI instruction held in a memory circuit is switchedly input in response to a signal externally supplied, is disposed, whereby the substitution of a program word can be realized using such an internal circuit. This brings forth the effect that a high-speed and reliable break can be achieved.

(2) Even in a microprocessor having an instruction pre-fetch function, it is only required that program addresses for fetching instructions from a memory device are monitored and that a trigger signal is input when an address desired for a break has been detected. This brings forth the effect that the break at the desired program address becomes possible.

(3) By employing the break based on the SWI instruction, interrupts based on inputs from terminals can be assembled in a user program. Thus, in developing user software, the processing of interrupt functions based on the terminal inputs is not restricted. This brings forth the effect that the software development conforming to the actual software to be developed can be performed with ease.

(4) By additionally providing the function of delivering out a signal which indicates the interrupt based on the SWI instruction, in other words, to the effect that the user program is under the break, an external circuit for recognizing the break status can be omitted. This brings forth the effect that a system for use as an in-circuit emulator can be simplified.

(5) An interrupt function separate from normal interrupts is provided by setting a specified operation mode. This brings forth the effect that, when a data processor is used as the in-circuit emulator, the breaks of the user program including the ordinary interrupt processes can be easily done by employing the special interrupt function.

(6) Owing to the above item (5), the interrupt function processes are not restricted in the development of the user software, and hence, there is attained the effect that the software development conforming to the actual software to be developed can be performed with ease.

(7) In the interrupt process which is accepted only in the specified operation mode, the function of acknowledging the mode is provided, thereby to bring forth the effect that the interrupt process of high reliability becomes possible.

(8) The function of delivering out to the effect that the interrupt process of the specified mode is proceeding, is additionally provided, whereby an external circuit for recognizing the interrupt process can be omitted. This brings forth the effect that a system for use as an in-circuit emulator can be simplified.

Although, in the above, the invention made by the inventor has been concretely described in conjunction with embodiments, it is needless to say that this invention is not restricted to the foregoing embodiments, but that it can be variously altered within a scope not departing from the purpose thereof. For example, in FIG. 1, the instruction store 28 may be made, not only of a mask ROM, but also a register, an EPROM or the like so as to permit writing based on software. In this case, any desired instruction word or data is stored in addition to the SWI instruction as stated before, whereby the desired instruction word or data can be inserted in the user program. The data processor may well have no instruction pre-fetch function as in FIG. 4. On the other hand, the single-chip microcomputer in FIG. 4 may well be furnished with the instruction pre-fetch function. Besides, the vector addresses of the interrupt processes based on the terminals or instructions may be in agreement or disagreement. Further, if the vector addresses of the normal interrupts can be relocated, the vector addresses of the interrupts based on the instructions in the ICE mode may be relocated or fixed. In this matter, the interrupt processing system can adopt various aspects of performance.

The break recognition signal BACK in the ICE mode is activated upon the acceptance of the interrupt based on the instruction SWI or the signal BRK. It can be deactivated by the execution of the corresponding instruction (for example, RTB instruction) for return from the break status. In the presence of the mode determination circuit, also this return instruction (RTB) may well be executed after checking the ICE mode. Further, a special break instruction may well be provided besides the SWI instruction and stored in the instruction store 28.

In the above, the present invention has been mainly described as to applications to microprocessors or microcomputers forming the background thereof. However, this invention is not restricted to them, but it can be extensively utilized for various data processors which execute data processing in accordance with programs.

Effects which are attained by typical aspects of performance of this invention will be briefly explained below: A circuit by which an SWI instruction held in a memory circuit is switchedly input in response to a signal supplied externally, is provided, whereby the substitution of a program word can be realized using such an internal circuit, so that a high-speed and reliable break can be effected. Moreover, an interrupt function separate from normal interrupts is established by setting a specified operation mode; whereby, when a data processor is used as an emulator, the break of a user program including the ordinary interrupt processes can be easily accomplished by utilizing the special interrupt function. Also, by additionally affording the function of delivering out a signal indicative of the break status, an external circuit can be simplified.

We claim:

1. An emulation system comprising:

a first memory which stores a program to be developed;

a second memory which stores an emulation program;

a microprocessor having a first mode to execute the program to be developed stored in the first memory and a second mode to execute the emulation program stored in the second memory, the microprocessor further including an external input terminal for receiving a break signal having a first state or a second state and an external output terminal for providing a break acknowledge signal which has a first level when being in the first mode and a second level when being in the second mode, wherein the microprocessor is responsive to the break signal changing from the first state to the second state and changes the operation mode thereof from the first mode to the second mode, wherein the microprocessor outputs address signals to fetch the program to be developed from the first memory when being in the first mode;

a circuit in which a break address is set, which compares the break address with an address signal outputted from the microprocessor operating in the first mode and which is coupled to the external input terminal of the microprocessor, the circuit changing the break signal from the first state to the second state when the break address is coincident with the address signal;

a selector coupled to the external output terminal of the microprocessor, the selector coupling the microprocessor to the first memory so as to transfer the address signals from the microprocessor to the first memory when the break acknowledge signal has the first level and coupling the microprocessor to the second memory so as to be capable of executing the emulation program when the break acknowledge signal has the second level.

2. An emulation system according to claim 1, wherein the break address indicates an instruction address regarding the program to be developed.

3. An emulation system according to claim 1, wherein the emulation program includes a return instruction therein, and wherein the microprocessor changes the state of the acknowledge signal from the second state to the break first state and changes its operation mode to the first mode when executing the return instruction.

* * * * *